United States Patent [19]

Ohlig

[11] Patent Number: 5,006,889
[45] Date of Patent: Apr. 9, 1991

[54] GRAPHIC MATERIAL REGISTRATION APPARATUS AND METHOD AND VACUUM HOLD DOWN APPARATUS THEREFOR

[76] Inventor: Ernest Ohlig, 2306 Holiday Rd., Newport Beach, Calif. 92660

[21] Appl. No.: 528,431

[22] Filed: May 25, 1990

[51] Int. Cl.$^5$ ............................................. G03B 27/20
[52] U.S. Cl. ........................................................ 355/91
[58] Field of Search ........................ 355/91, 93, 94, 75, 355/76, 132, 104, 73, 85, 83, 122; 354/203, 299; 248/362

[56] References Cited

U.S. PATENT DOCUMENTS

| | | | |
|---|---|---|---|
| 3,813,682 | 5/1974 | Nishikawa et al. | 354/203 |
| 3,890,042 | 6/1975 | Miyauchi et al. | 355/53 |
| 3,955,163 | 5/1976 | Novak | 355/132 |
| 3,995,955 | 12/1976 | Topfer | 355/91 |
| 4,029,404 | 6/1977 | Mizukami et al. | 355/91 |
| 4,176,949 | 12/1979 | Burgess | 355/104 |
| 4,240,743 | 12/1980 | Hliboki et al. | 355/73 |
| 4,360,259 | 11/1982 | Burgess | 354/299 |
| 4,423,851 | 1/1984 | Heitmann | 248/362 |
| 4,437,759 | 3/1984 | Mizukami et al. | 355/91 |
| 4,449,814 | 5/1984 | Theimer | 355/85 |
| 4,464,047 | 8/1984 | Maher et al. | 355/93 |
| 4,484,813 | 11/1984 | Maher et al. | 355/93 |
| 4,526,463 | 7/1985 | Hickey et al. | 355/83 |
| 4,536,085 | 8/1985 | Hliboki et al. | 355/93 |
| 4,551,016 | 11/1985 | Maher et al. | 355/91 |
| 4,674,868 | 6/1987 | Theimer | 355/122 |
| 4,676,633 | 6/1987 | Burgess et al. | 355/91 |
| 4,707,125 | 11/1987 | Ohlig et al. | 355/94 |
| 4,916,484 | 4/1990 | Ohlig | 355/91 |

OTHER PUBLICATIONS

Douthitt Catalog & Price List-Feb. 1, 1986; Douthitt Corp. 245 Adair Street, Detroit, Michigan 48207-4287.

Primary Examiner—Richard A. Wintercorn
Attorney, Agent, or Firm—A. C. Smith

[57] ABSTRACT

Improved method and apparatus for supporting photographic sheet materials in intimate surface contact during contact exposure includes a flexible membrane which forms a common boundary wall between two gas-tight chambers. Air at ambient pressure is admitted to one chamber at a controlled rate slower than air is evacuated from the other chamber containing the photographic sheet materials. Progressive expansion of the surface area of contacting force assures that residual volumes of air between photographic sheets are squeezed out in an orderly pattern and not trapped in isolated pockets that distort resulting photographic images. A dimensionally stable blanket is supported about the perimeter to slide in a retaining frame against resilient cushioning that urges the blanket into engagement with the platen.

9 Claims, 4 Drawing Sheets

GRAPHIC MATERIAL REGISTRATION APPARATUS AND METHOD AND VACUUM HOLD DOWN APPARATUS THEREFOR

RELATED APPLICATION

The subject matter of this application relates to the subject matter set forth in U.S. Pat. No. 4,916,484 entitled "Graphic Material Registration Apparatus and Method," filed Mar. 20, 1989, by Ernest Ohlig, and to the subject matter set forth in U.S. Pat. No. 4,812,883 entitled "Graphic Material Registration Apparatus And Method," filed on Dec. 12, 1987 by Ernest Ohlig, and the subject matter of these U.S. Patents is hereby incorporated herein by reference.

BACKGROUND OF THE INVENTION

This invention pertains to the method and means for firmly supporting photographic materials in accurate registration during contact exposure, and more particularly to a passive hold-down apparatus and method in which the region beneath an impervious membrane is selectively evacuated in a manner that develops a hold-down force which does not significantly alter registration of the photographic materials.

Contact exposure of photographic copy and master sheets requires accurate registration between such sheets during exposure. Certain known schemes rely upon the sheets being pressed together and against an exposure plate by various mechanisms in order to maintain the sheets in accurate registration during exposure through the exposure plate. One known mechanism depends upon a flexible, weighted blanket being rolled out over the photographic sheets to hold them in place on the exposure plate. Still other known mechanisms rely upon air pressure or resilient means to force the photographic sheets together and against the exposure plate during exposure. Mechanisms of these types are disclosed in the literature (see, for example, U.S. Pat. Nos. 4,029,404 and 4,551,016 and 4,674,868 and 4,707,125).

One common disadvantage associated with mechanisms of these types is that air pockets may remain at random locations between the photographic master and copy sheets and between the exposure plate and sheets that may produce distorted photographic images due to non-contacting reproduction where the air pockets are located. Surface-textured vacuum blankets have been used to facilitate removal of air (see, for example, U.S. Pat. No. 4,705,392). Excessive pressure applied to the photographic sheets to assure that no air pockets remain unnecessarily increases the weight, strength and costs of the exposure plate and associated supporting structures, in order to withstand the pressing forces, and may contribute to distortion of the sheets which may be forced to 'flow' and reform around an air pocket. Even dimensionally stable photographic sheets may stretch to some extent when pulled unevenly, and may be shifted out of position and registration when pressure is applied and covering blanket shifts or stretches. In addition, excessive pressure applied to photographic sheets, particularly of plastic materials, introduces stresses which may form Newton rings in the reproduction, especially under exposure to collimated light.

These disadvantages have been resolved to some degree by use of 'slip-sheet' or extra layer of film such as Mylar (Trademark of DuPont Co.) between the material to be exposed and the covering vacuum blanket. This film may be moved or pulled slightly by the covering blanket during development of hold-down force upon evacuation of air beneath the blanket without moving or pulling the material to be exposed out of position. However, this scheme involves additional set-up time, and the 'slip-sheet' must be stored while not in use, and must be kept clean to avoid transferring dust onto the material being exposed, and typically must be replaced at frequent intervals.

SUMMARY OF THE INVENTION

In accordance with the present invention, pressure differential is established about a flexible membrane or vacuum blanket that covers the photographic sheets and the exposure plate in a manner that assures removal of air pockets from between the photographic sheets as the force attributable to ambient air pressure is progressively applied. The vacuum blanket is formed of a material which is slightly flexible and which provides a slick and dry lubricous surface that will not adhere to the material to be exposed. The blanket is mounted to slide within the supporting frame to take up mechanical alignment tolerances between the supporting frame and the exposure platen.

DESCRIPTION OF THE PREFERRED EMBODIMENT

Figure 1:
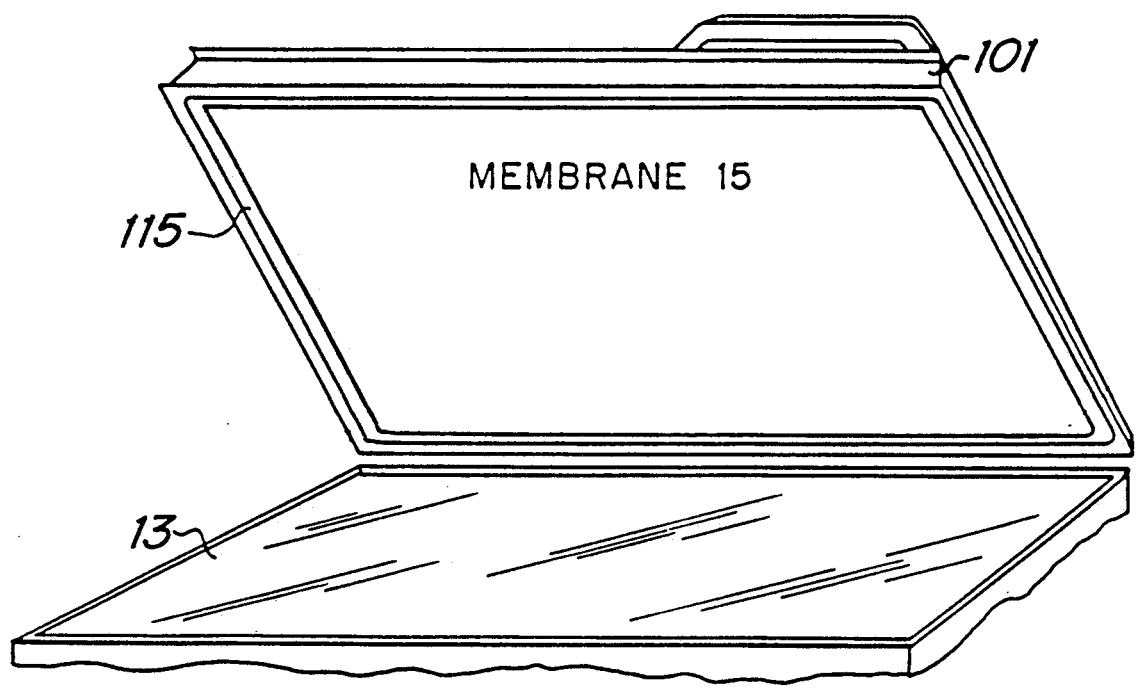
FIG. 1 is a pictorial representation of one exposure apparatus for selectively processing photographic sheets upon a surface platen that is illuminated therethrough from below.

Referring now to FIG. 1, there is shown a perspective view of photographic exposure apparatus including an exposure platen 13 such as a sheet of glass which is supported on a housing for a light source disposed below the platen 3 (not shown) to expose photographic materials positioned on the top surface of the platen 13.

Sheet-like photographic materials may be held in registration during exposure to the light source by overlaying such photographic materials with a membrane 15 that forms a fluid-tight seal 115 about the exposure platen 13, and by evacuating the residual volume of air between membrane 15 and platen 13 in order to establish a pressure differential across the membrane 15 to exert force on photographic materials which are thereby held firmly in position against the exposure platen 13. The membrane 15 may be conveniently mounted in a lid 101 which may be hinged at the rear of the exposure platen 13 to facilitate convenient assembly of photographic materials on the exposure platen 13, with the membrane 15 disposed on top of the photographic materials.

Figure 2:
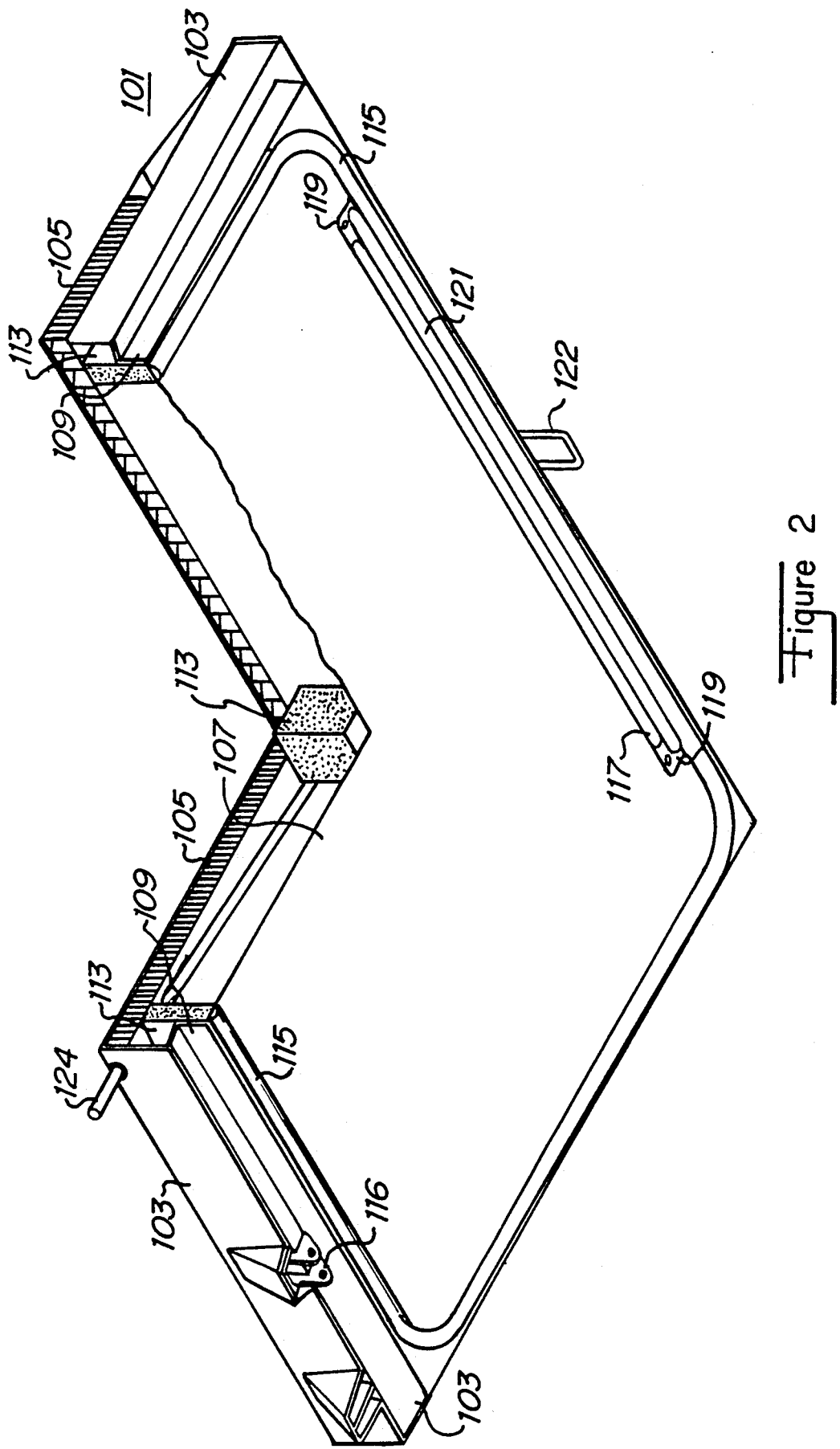
FIG. 2 is a cut-away perspective view of an embodiment of the hold-down apparatus according to the present invention.
Figure 3:
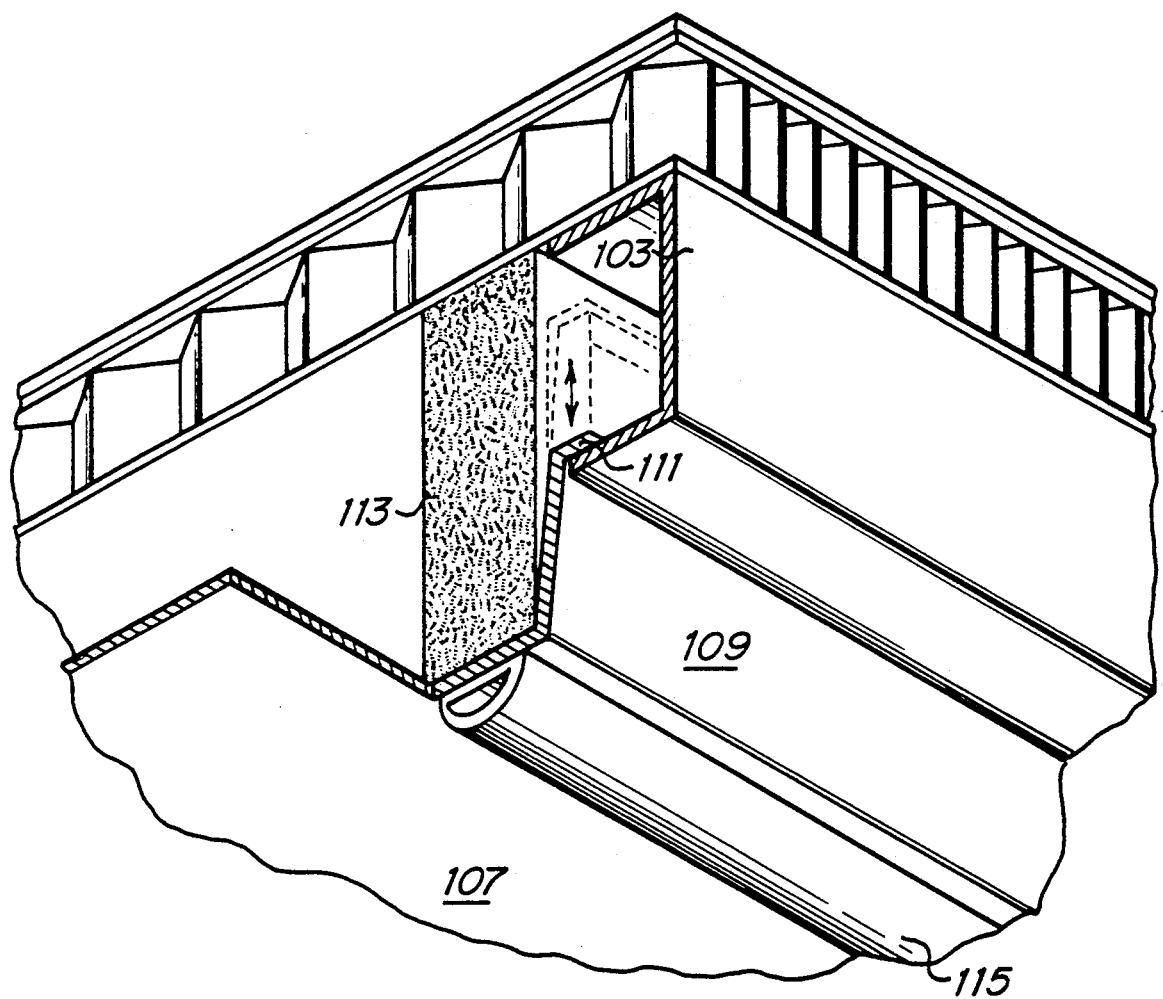
FIG. 3 is an expanded cut-away perspective view of the embodiment of FIG. 2 in which the slide-mounting of the covering blanket within the supporting frame is illustrated.

Referring now to FIG. 2, there is shown a cut-away perspective view of a covering platen 101 (viewed from the rear) that is formed of perimeter side frames 103 attached to a laminated top plate 105. A membrane or covering blanket 107 is disposed over an area in excess of the exposure area through a glass exposure platen (not shown), and is sufficiently rigid and dimensionally stable to include integral side rails 109 that are disposed about the perimeter and substantially normally to the surface of the blanket 107. These side rails 109 include an outward-extending flange 111 along the edge thereof that is remote from the blanket 107, as more clearly illustrated in the expanded view of FIG. 3. This perimeter flange 111 hooks behind the perimeter side frame 103 to retain the integral blanket 107 with side rails 109 and flange 111 captivated in the covering platen 101. Resilient cushions, for example, of resilient foam material 113 are disposed about the perimeter of the blanket 107 (i.e., along the side rails 109 and perimeter side frames) and at selected locations within the area of the blanket 107 to resiliently urge the blanket 107 away from the covering platen 101 and into resilient engagement of the flange 111 with the perimeter side frames 103. In this manner, the blanket 107 may be brought into substantial planar registration with an exposure platen (not shown) for good vacuum seal therewith while the covering platen 101 may be out of planar alignment, and the perimeter side rails 109 and flange 111 will be free to reposition relative to the perimeter side frame 103, as illustrated in FIG. 3, as the resilient cushions 113 yield to new dimensional conditions. Hinges 116 (one shown) along the rear edge of the covering platen 101 support the assembly in conventional manner relative to the exposure platen, and a vacuum line 124 is coupled to vacuum ports 119 within this covering platen 101.

Figure 4:
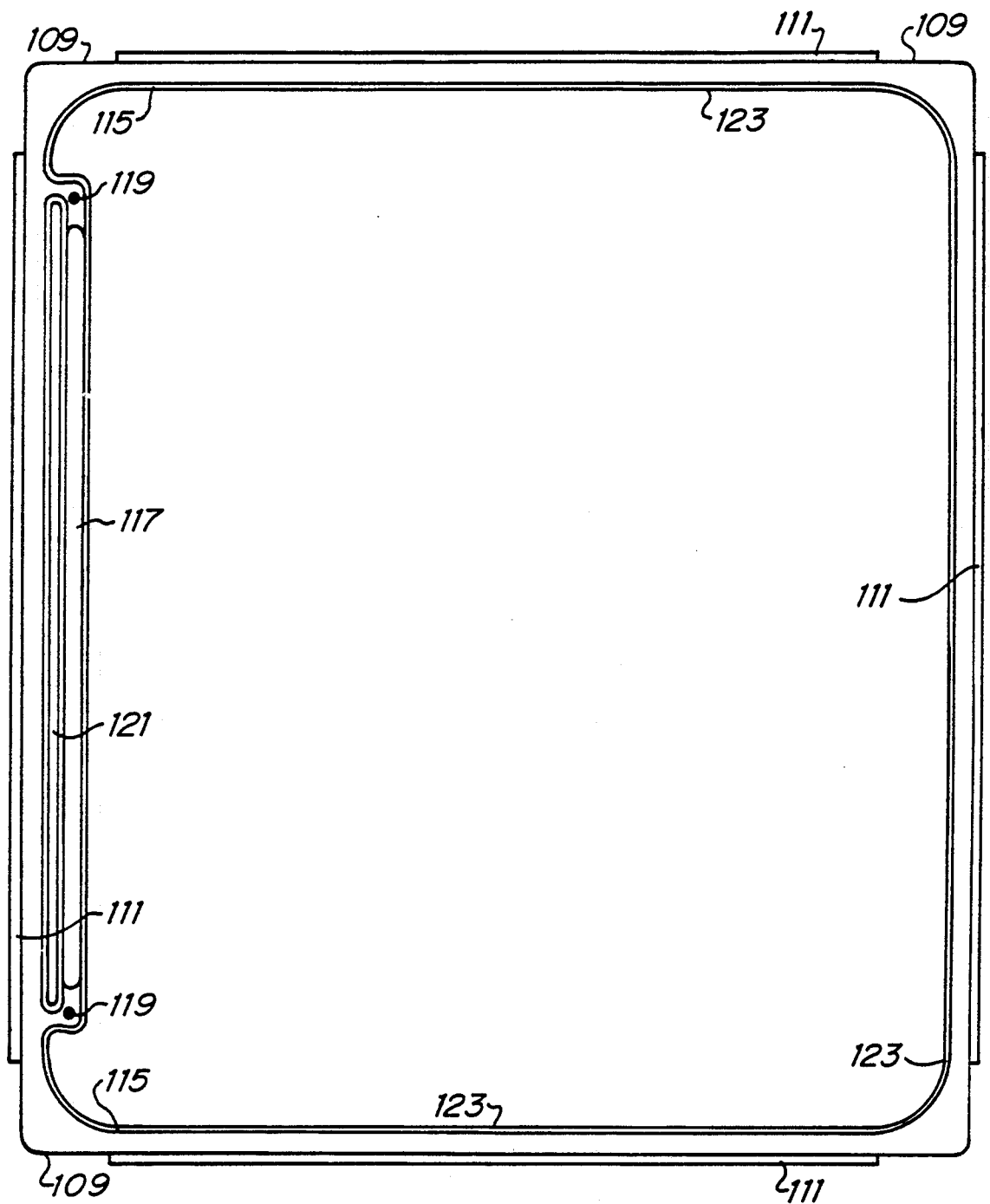
FIG. 4 is a plan view of the covering blanket in accordance with the embodiment of FIG. 2.

The blanket 107 also includes an elevated resilient seal 115 around the entire perimeter of the exposure area, as illustrated in FIGS. 3 and 4 for forming a vacuum seal with an exposure platen (not shown) when in contact therewith. The blanket 107 also includes a recessed channel 117 to receive protruding alignment pins commonly mounted near the forward edge of an exposure platen. Since the greater hold-down force tends to develop near the vacuum ports where the greatest pressure differential tends to be established, the vacuum ports 119 and a recessed groove 121 coupled with the vacuum ports 119 are disposed along the forward edge of the blanket 107 to provide initial and greatest hold-down force for photographic materials between the blanket and exposure platen near the forward edge. Also, a perimeter groove or recess 123 is disposed about the perimeter of the exposure area of the blanket 107 near the peripheral seal 115, as illustrated in FIG. 4, and is coupled to the vacuum ports 119 and recessed groove 121 to facilitate evacuation of residual air from between blanket 107 and exposure platen. Thus, as illustrated in the plan view of FIG. 4, the blanket 107 includes integral flanges 111 at the remote edges of the perimeter side rails 109 and a perimeter seal 115 surrounds the exposure area of the blanket 107 about the perimeter thereof. The blanket 107 according to the present invention may thus be conveniently 'snapped', in and out of placement within the perimeter side frames 103 as needed for cleaning or replacement. The blanket 107 may be formed by injection molding or vacuum-forming, or the like, of a flexible plastic material having a slick, dry lubricous surface property to assure that photographic materials will not adhere thereto to be pulled out of registration thereby as hold-down force is developed via pressure differential between blanket 107 and exposure platen. The slick, dry lubricous surface of the blanket 107 may be molded with a lightly-patterned surface to facilitate evacuation of air without causing an imprint on the exposure materials. The central region of the blanket 107 may be covered with a soft, auxiliary cushion, for example, of foam material that may be laid in loose or retained in position on the blanket 107 with adhesive. Such auxiliary cushion (not shown) may be necessary for use with exposure materials of greater thickness, or with exposure materials that may be damaged by the contact pressure of a firm or hard blanket 107. Suitable materials for the blanket 107 include polypropylene, polyethylene, Mylar or ABS plastics which are moldable to yield the blanket having integral features, as previously described, and having sufficient thickness in the side rails 109 and flange 111 regions to provide the slideable, captive mounting in the covering platen, and with sufficient thickness in the central exposure area of the blanket 107 to provide flexible contact with photographic materials interposed between the blanket 107 and an exposure platen. Of course, the blanket 107 and mounting assembly of this embodiment may also be inverted for use beneath an exposure platen that may be mounted to descend into substantially planar relationship with the blanket 107.

Therefore, the hold-down apparatus according to this embodiment of the present invention greatly improves the vacuum holddown of photographic materials on an exposure platen without distorting or pulling the materials out of registration as the hold-down force is developed between exposure platen and overlying vacuum blanket.

What is claimed is:

1. A vacuum blanket for use with a radiation-transmissive platen disposed to secure a photographic sheet for exposure to radiation therethrough, the assembly comprising:
    a flexible, substantially gas-impervious blanket having substantial dimensional stability disposed on one side of the radiation transmissive platen to form a seal therewith substantially about a peripheral boundary thereof and to receive the photographic sheet within the peripheral boundary; said blanket including side rails along the sides of the blanket oriented substantially normal thereto for supporting the blanket for movement relative to the radiation transmissive platen.

2. The vacuum blanket according to claim 1 wherein said side rails are integrally formed with the blanket and include flange means disposed along a portion of the edges of the side rails remote from the blanket for retaining the blanket in variable supported relationship to the radiation transmissive platen.

3. Photographic exposure apparatus comprising: a radiation transmissive platen disposed to receive a photographic sheet in intimate registration with one surface for exposure thereof to a source of radiation through the platen;
    a flexible, substantially gas-impervious blanket having substantial dimensional stability disposed on one side of the platen for selectively forming therewith a gas-impervious chamber within a peripheral boundary for receiving the photographic sheet therein in positional registration adjacent the platen, said blanket including side rails disposed substantially normal to the blanket along the perimeter edges thereof; and
    means cooperating with the side rails for supporting the blanket for movement relative to the radiation transmissive platen.

4. Photographic exposure apparatus as in claim 3 including flange means disposed along portions of the edges of the side rails remote from the blanket; and frame means disposed to surround the side rails for engaging the flange means to retain the blanket within the frame means.

5. Photographic exposure apparatus as in claim 4 including resilient cushion means disposed near the side rails for resiliently urging engagement of said flange means with said frame means.

6. Photographic exposure apparatus as in claim 4 wherein said side rails and flange means are integrally formed with said blanket.

7. A method of supporting a sheet of photographic material against a platen for exposure to radiation therethrough comprising the steps of:

forming a pressure chamber including the platen and a gas-impervious flexible blanket as boundary walls thereof and disposed to receive the photographic material therein in proximity to the platen;

variably supporting the blanket about the perimeter thereof relative to the platen; and evacuating the pressure chamber to urge the membrane and layer against the photographic material and platen as the blanket is slideably supported about the periphery thereof.

8. The method according to claim 7 comprising the additional step of:

resiliently cushioning the blanket substantially along the perimeter thereof to resiliently urge the photographic material against the platen.

9. The method according to claim 7 wherein the step of variably supporting the blanket includes slideably supporting the blanket for movement substantially normal to the surface of the blanket.

* * * * *